US009961266B2

United States Patent
Yasuma

(10) Patent No.: US 9,961,266 B2
(45) Date of Patent: May 1, 2018

(54) INFORMATION PROCESSING APPARATUS, TRANSMISSION METHOD, AND STORAGE MEDIUM

(71) Applicant: CANON KABUSHIKI KAISHA, Tokyo (JP)

(72) Inventor: Kensuke Yasuma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 15/213,162

(22) Filed: Jul. 18, 2016

(65) Prior Publication Data

US 2017/0026583 A1 Jan. 26, 2017

(30) Foreign Application Priority Data

Jul. 21, 2015 (JP) .................. 2015-144407

(51) Int. Cl.
| | |
|---|---|
| *H04N 5/232* | (2006.01) |
| *G06K 9/62* | (2006.01) |
| *G06K 9/46* | (2006.01) |
| *G06K 9/78* | (2006.01) |
| *G06F 3/12* | (2006.01) |
| *H04N 1/00* | (2006.01) |

(52) U.S. Cl.
CPC ....... *H04N 5/23293* (2013.01); *G06F 3/1204* (2013.01); *G06F 3/126* (2013.01); *G06F 3/1292* (2013.01); *G06K 9/46* (2013.01); *G06K 9/62* (2013.01); *G06K 9/78* (2013.01); *H04N 1/00127* (2013.01)

(58) Field of Classification Search
CPC ............ H04N 5/23293; H04N 1/00127; G06F 3/1292; G06F 3/126; G06F 3/1204; G06K 9/78; G06K 9/46; G06K 9/62

USPC ....................................................... 725/105
See application file for complete search history.

(56) References Cited

U.S. PATENT DOCUMENTS

| | | | |
|---|---|---|---|
| 2008/0147730 A1* | 6/2008 | Lee ................. | G06Q 30/0212 |
| 2012/0251011 A1* | 10/2012 | Gao ................. | G06K 9/00671 |
| | | | 382/224 |
| 2013/0011009 A1* | 1/2013 | Chen ................. | G06K 9/00979 |
| | | | 382/103 |
| 2014/0053086 A1* | 2/2014 | Kim ................. | H04L 65/403 |
| | | | 715/753 |
| 2014/0156704 A1* | 6/2014 | Jenkins ........... | G06F 17/30241 |
| | | | 707/772 |
| 2016/0259988 A1* | 9/2016 | Piao ................. | G06F 17/30253 |
| 2016/0342855 A1* | 11/2016 | Hattori ............ | B60Q 9/008 |

FOREIGN PATENT DOCUMENTS

JP    2000-032036 A    1/2000

* cited by examiner

*Primary Examiner* — Hung Lam
(74) *Attorney, Agent, or Firm* — Canon U.S.A., Inc. IP Division

(57) ABSTRACT

An information processing apparatus includes a first acquisition unit, a recognition unit, a specification unit, and a transmission unit. The first acquisition unit acquires an image. The recognition unit recognizes an object included in the image. The specification unit causes a user to specify data to be transmitted to the object recognized by the recognition unit. The transmission unit transmits the specified data to an apparatus identified by destination information corresponding to the object, according to the specification by the specification unit.

16 Claims, 9 Drawing Sheets

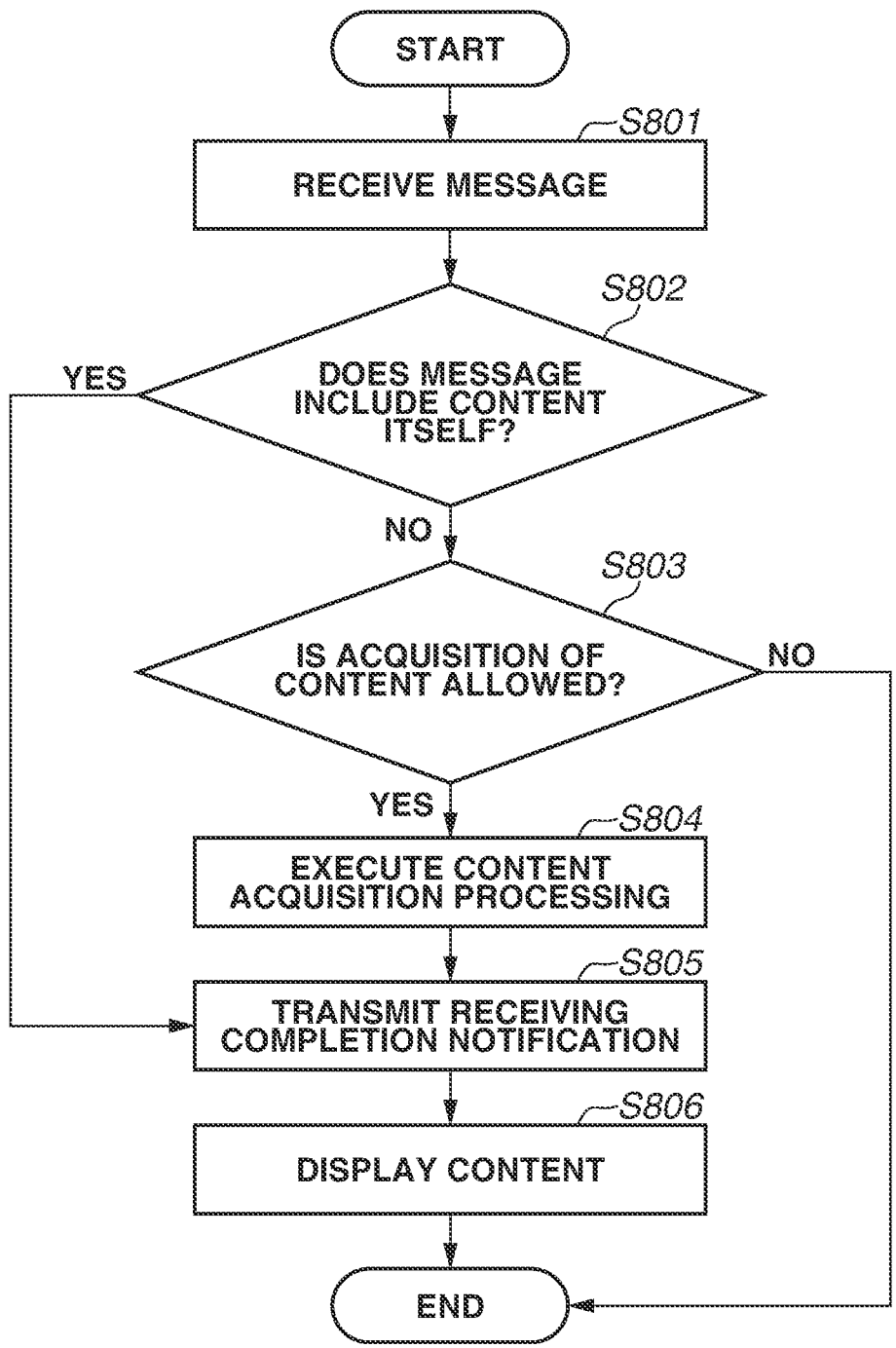

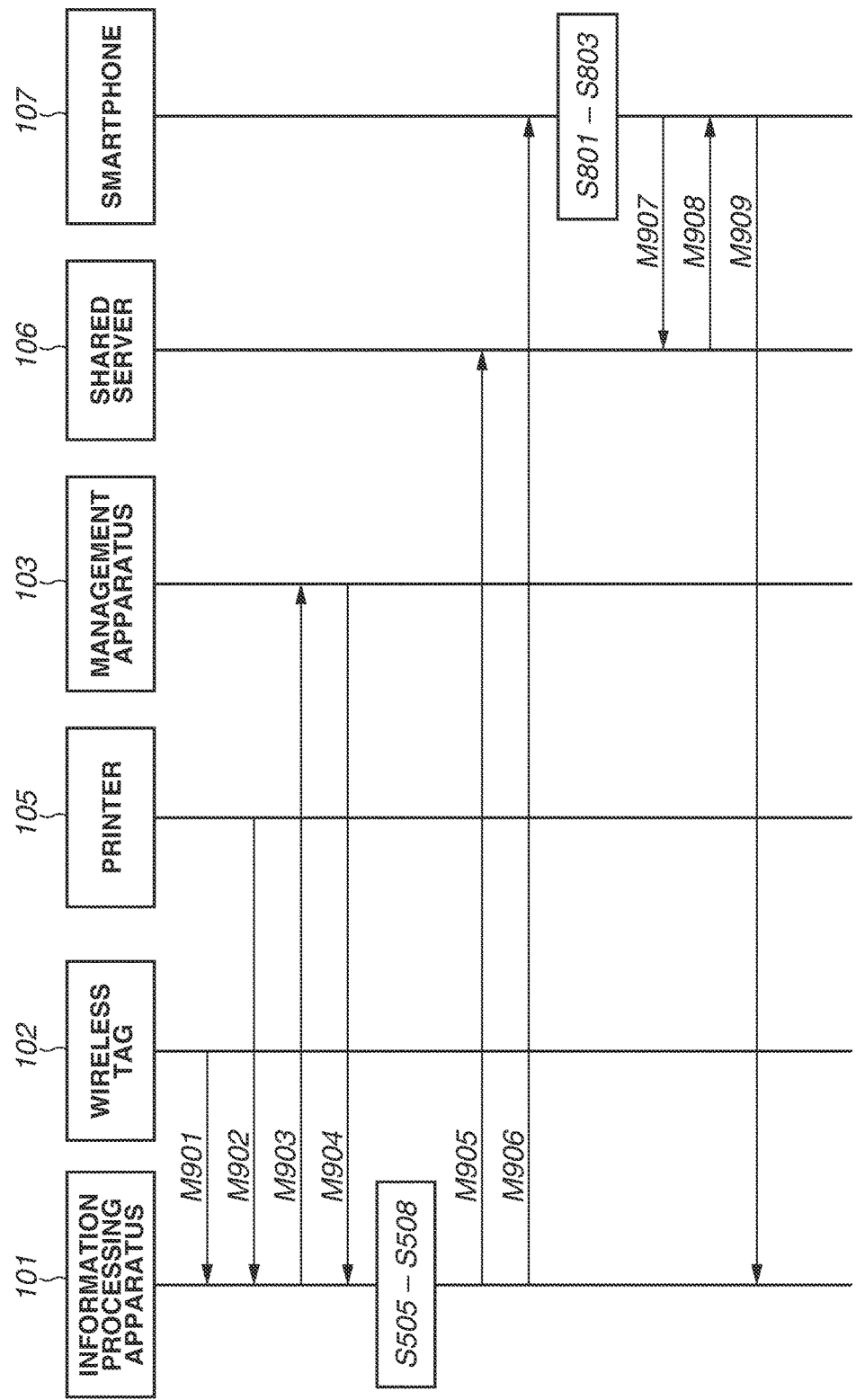

INFORMATION PROCESSING APPARATUS, TRANSMISSION METHOD, AND STORAGE MEDIUM

BACKGROUND OF THE INVENTION

Field of the Invention

The present invention relates to an information processing apparatus that transmits data.

Description of the Related Art

When data is to be transmitted to an addressee, the data is transmitted by specifying an e-mail address (Japanese Patent Application Laid-Open No. 2000-032036). Further, there is a technique for transmitting data to a server on a network by dragging and dropping a data icon into a folder icon managed by the server.

It is assumed that data is to be transmitted to an addressee existing in a visible area. In this case, if the data to be delivered is a tangible object such as a sheet of paper, for example, the data can be directly delivered to the addressee. On the contrary, when digital data such as an e-mail is to be delivered, a mail address of the addressee has to be looked up and specified from an address book of an e-mail application. Thus, this operation is complicated in comparison to the operation in the case where the tangible object is delivered directly.

SUMMARY OF THE INVENTION

The present invention is directed to a technique of enabling a user to easily select an addressee of data.

According to an aspect of the present invention, an information processing apparatus includes a first acquisition unit configured to acquire an image, a recognition unit configured to recognize an object included in the image, a specification unit configured to cause a user to specify data to be transmitted to the object recognized by the recognition unit, and a transmission unit configured to transmit the specified data to an apparatus identified by destination information corresponding to the object, according to the specification by the specification unit.

Further features of the present invention will become apparent from the following description of exemplary embodiments with reference to the attached drawings.

BRIEF DESCRIPTION OF THE DRAWINGS

FIG. 8 is a flowchart illustrating processing realized by a smartphone.

FIG. 9 is a sequence chart of the system.

DESCRIPTION OF THE EMBODIMENTS

Various exemplary embodiments, features, and aspects of the invention will be described in detail below with reference to the drawings.

Figure 1:
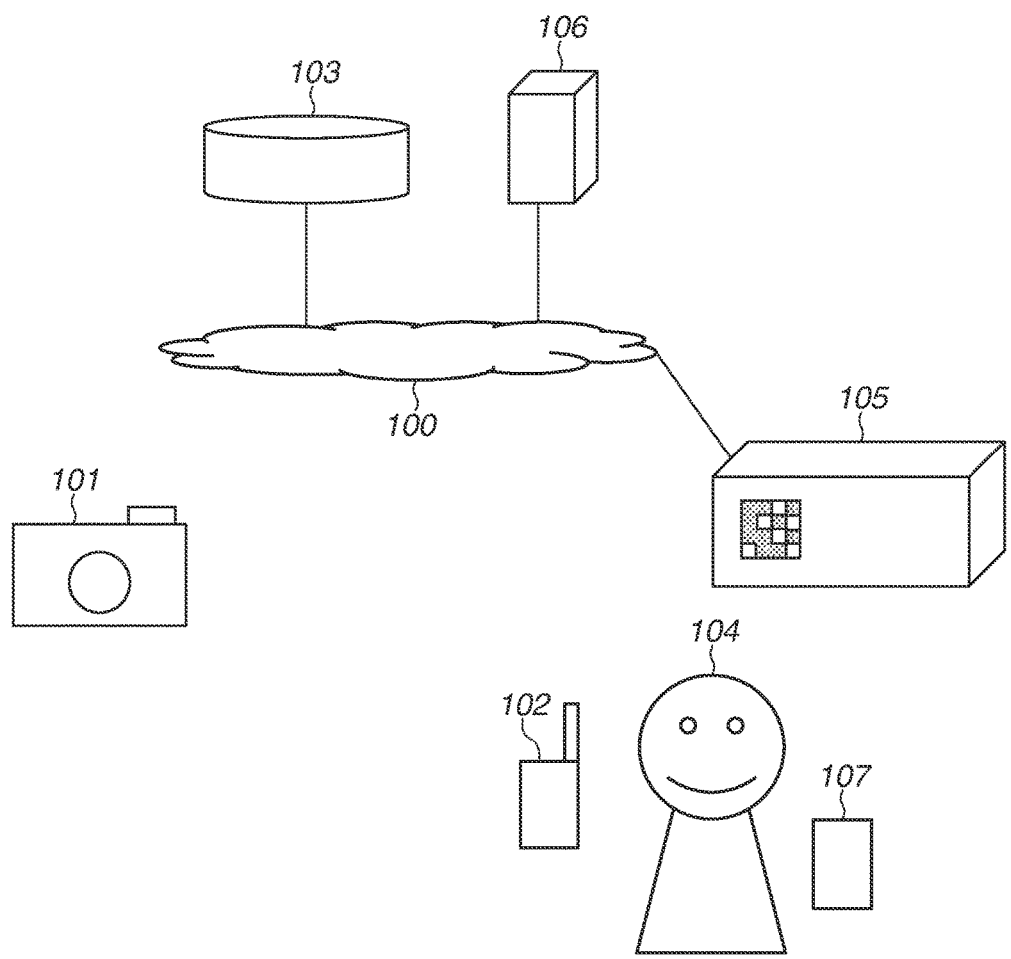
FIG. 1 is a diagram illustrating a configuration of a system.

FIG. 1 is a diagram illustrating a configuration of a data transmission system according to an exemplary embodiment of the present invention.

A network 100 is the Internet. However, the network 100 is not limited to the Internet, but may be a wide area network (WAN), a local area network (LAN), a personal area network (PAN), or may be a combination of these networks.

An information processing apparatus 101 captures and recognizes objects such as an imaging target 104 and a printer 105. Further, the information processing apparatus 101 transmits content data (hereinafter, referred to as "content") to apparatuses identified by addresses respectively corresponding thereto. Hereinafter, the content will be described by taking image data as an example. However, the content is not limited to the above, and the content may be document data, image data, moving image data, audio data, message data, program data, or command data, or may be a combination of these data.

In addition, the information processing apparatus 101 executes wireless communication compliant with the Institute of Electrical and Electronics Engineers (IEEE) 802.11 series with a wireless tag 102. However, the configuration is not limited to the above, and the present exemplary embodiment is applicable to information processing apparatuses compliant with other wireless communication methods such as Bluetooth (registered trademark), an ultra-wideband (UWB), ZigBee, and multiband OFDM alliance (MBOA). Furthermore, the present exemplary embodiment is also applicable to an information processing apparatus compliant with a wired communication method of a wired LAN. Further, the UWB includes a wireless universal serial bus (USB), the wireless 1394, and the wimedia network (WiNET).

The wireless tag 102 transmits identifier information of the wireless tag 102. Herein, a media access control (MAC) address of the wireless tag 102 is used as the identifier. However, the identifier is not limited to the above, and an internet protocol (IP) address or a universally unique identifier (UUID) of the wireless tag 102 may be used as the identifier.

Herein, the wireless tag 102 periodically informs identification information at a certain interval by including the identifier information as one information element of a beacon specified in the IEEE 802.11 series. However, the transmission method is not limited to the above, and the wireless tag 102 may transmit the identification information by including the identification information in a response (e.g., a probe response signal as a search response) with respect to a request (e.g., probe request signal as a search request) from the information processing apparatus 101.

The imaging target 104 and the printer 105 are target objects recognized by the information processing apparatus 101. The imaging target 104 owns the wireless tag 102 and a smartphone 107. The wireless tag 102 may be built into the smartphone 107.

Further, a two-dimensional code (e.g., quick response (QR) code (registered trademark)) including the identifier information of the printer 105 is attached to the printer 105. In addition, instead of the two-dimensional code, a one-dimensional barcode or a built-in wireless tag (not illustrated) may be used. In a case where a wireless tag is to be built in, the wireless tag has a configuration similar to that of the wireless tag 102 and transmits the identifier information of the printer 105.

A management apparatus 103 manages image feature information of the imaging target 104 and the printer 105. Further, the management apparatus 103 manages destination apparatuses of content respectively corresponding to the imaging target 104 and the printer 105. Herein, a destination apparatus corresponding to the imaging target 104 is the smartphone 107, whereas a destination apparatus corresponding to the printer 105 is the printer 105 itself. More specifically, the management apparatus 103 manages destination information of the destination apparatus. Hereinafter, the destination information will be described by taking a mail address or a uniform resource locator (URL) as an example. However, the destination information is not limited to the above, and the destination information may be an IP address, a MAC address, or a phone number (i.e., short message service (SMS) address).

Further, in response to a request from the information processing apparatus 101, the management apparatus 103 transmits metadata that stores image feature information and destination information to the information processing apparatus 101. A shared server 106 manages a content by receiving the content from the information processing apparatus 101. Then, the shared server 106 releases the content to the information processing apparatus 101 and an external apparatus.

Figure 2:
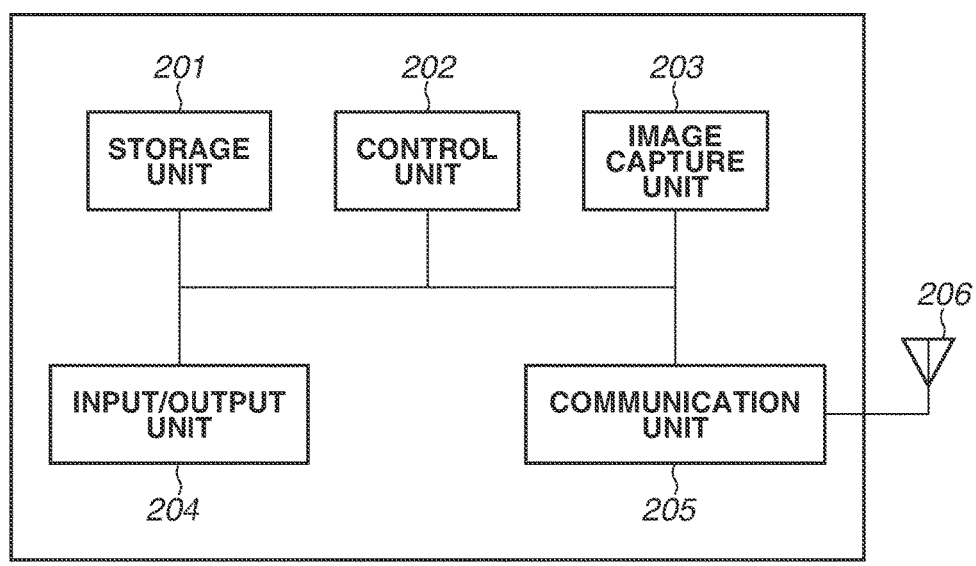
FIG. 2 is a block diagram illustrating a hardware configuration of an information processing apparatus.

FIG. 2 is a block diagram illustrating a hardware configuration of the information processing apparatus 101.

A storage unit 201 is configured of a read only memory (ROM) and a random access memory (RAM), and stores various kinds of information such as a program for executing various operations described below and a communication parameter for wireless communication. Further the storage unit 201 stores the contents. In addition to the memories such as the ROM and the RAM, storage media such as a flexible disk, a hard disk, an optical disk, a magneto-optical disk, a compact disk read-only memory (CD-ROM), a compact disk recordable (CD-R), a magnetic tape, a non-volatile memory card, and a digital versatile disk (DVD) may be used as the storage unit 201.

A control unit 202 is configured of a central processing unit (CPU) or a micro processing unit (MPU), and controls the entirety of the information processing apparatus 101 by executing the program stored in the storage unit 201. Further, the entirety of the information processing apparatus 101 may be controlled by cooperatively operating with an operating system (OS) executed by the control unit 202.

Further, the control unit 202 controls the image capture unit 203 to execute predetermined processing such as capturing, printing, or projecting an image. The image capture unit 203 adjusts a view angle by using an optical zoom function or a digital zoom function to execute imaging processing (image-capturing).

An input/output unit 204 is configured of a touch panel so as to receive various operation inputs from a user and display various kinds of information on a display screen of the touch panel. Further, an input using a mouse or an input using a gesture performed in space may be received in addition to the input using the touch panel. Furthermore, the output may include an audio output via a speaker or a vibrational output in addition to the output displayed on the screen of the touch panel.

The input/output unit 204 arranges and displays an image and a content captured by the image capture unit 203. Further, the input/output unit 204 causes a user to specify a displayed object such as the imaging target 104 or the printer 105 and a content via the touch panel. Further, the input/output unit 204 detects an operation so-called "drag-and-drop" (hereinafter, referred to as "D-and-D"), in which the content is moved to the object while being held in a selected state and released at the object. With this detection, the input/output unit 204 determines that the content and the object are specified by the user. Hereinafter, this operation is expressed as "D-and-D the content into the object".

Further, the input/output unit 204 may determine that the content and the object are specified by detecting an operation in which the displayed content and the object are concurrently pointed with two fingers instead of detecting the D-and-D operation. Further, the input/output unit 204 may determine that the content and the object are specified by detecting a pinching operation with respect to the displayed content and the object. Furthermore, the input/output unit 204 may determine that the content and the object are specified by detecting a flick operation in which a user quickly flicks a screen by sliding a finger from the content to the object.

A communication unit 205 executes control of wireless communication compliant with the IEEE 802.11 series or control of IP communication. Further, the communication unit 205 controls an antenna 206 to transmit and receive a wireless signal of the wireless communication.

Figure 3:
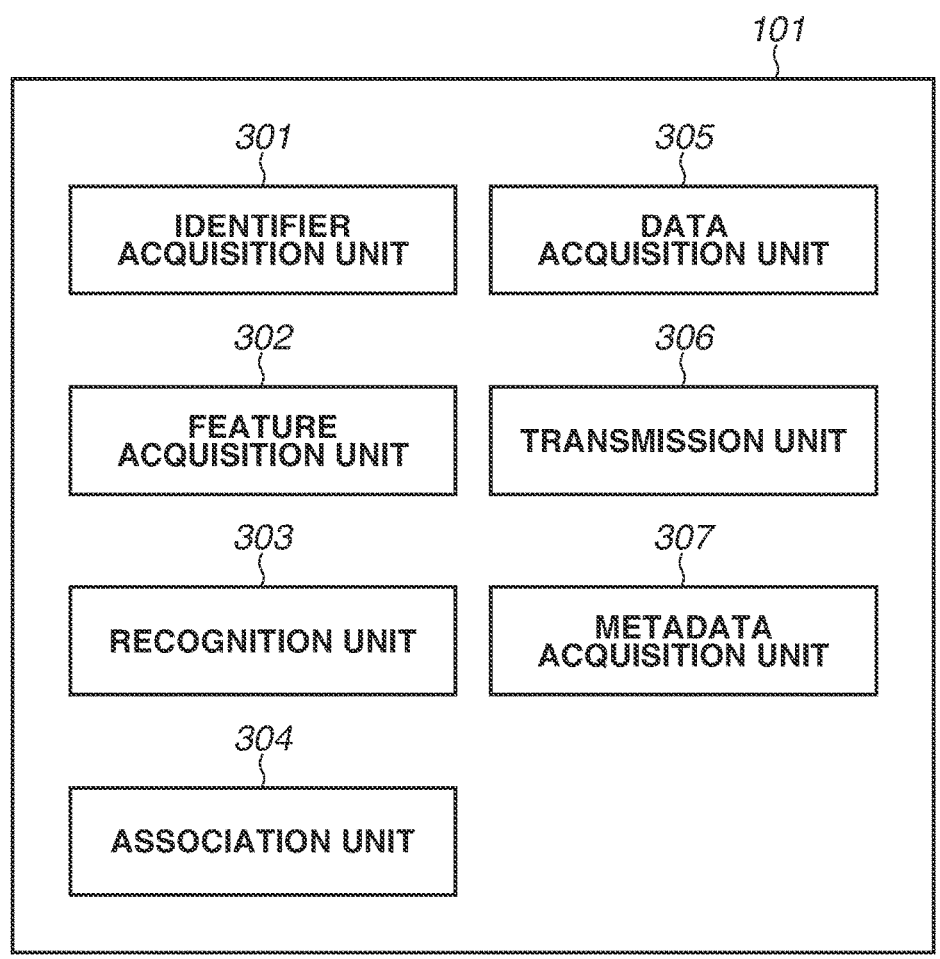
FIG. 3 is a block diagram illustrating a module configuration of the information processing apparatus.

FIG. 3 is a block diagram illustrating software functional blocks which the control unit 202 of the information processing apparatus 101 realizes by reading a program stored in the storage unit 201. In addition, at least a part of the software functional blocks illustrated in FIG. 3 may be realized by hardware. For example, in a case where a software functional block is to be realized by the hardware, with the use of a predetermined compiler, a dedicated circuit is automatically generated on a field programmable gate array (FPGA) through a program for realizing the functional block. Then, this circuit may be used as a hardware module having a function of the software module. Further, as with the case of the FPGA, a gate array circuit may be formed and realized as the hardware.

An identifier acquisition unit 301 acquires identifier information of the wireless tag 102 and identifier information of the printer 105 through wireless communication. However, the identifier information may be acquired through image recognition of a two-dimensional barcode or an embedded image instead of being acquired through the wireless communication.

A feature acquisition unit 302 acquires image feature information of the imaging target 104 corresponding to the identifier of the wireless tag 102 or the identifier of the printer 105 from the management apparatus 103. In addition, the storage unit 201 may store the identifier and the image feature information in association with each other, so that the feature acquisition unit 302 may acquire the image feature information corresponding to the identifier from the storage unit 201.

A recognition unit 303 recognizes an object included in the image captured by the image capture unit 203. The recognition unit 303 recognizes a person's face, a two-dimensional barcode, and a printer. Further, when a recognized object is a person's face, the recognition unit 303 executes individual identification. In other words, the recognition unit 303 identifies who the detected face is.

When the user "D-and-D" the content into the object via the input/output unit 204, an association unit 304 associates the content with the object. A data acquisition unit 305 acquires the content stored in the storage unit 201. In addition, the data acquisition unit 305 may acquire the content from the shared server 106. A transmission unit 306 transmits the content to the shared server 106.

A metadata acquisition unit 307 acquires metadata that stores image feature information and destination information of the imaging target 104 and the printer 105 from the management apparatus 103. In addition, the metadata acquisition unit 307 may directly acquire respective metadata from the wireless tag 102 and the printer 105.

Figure 4:
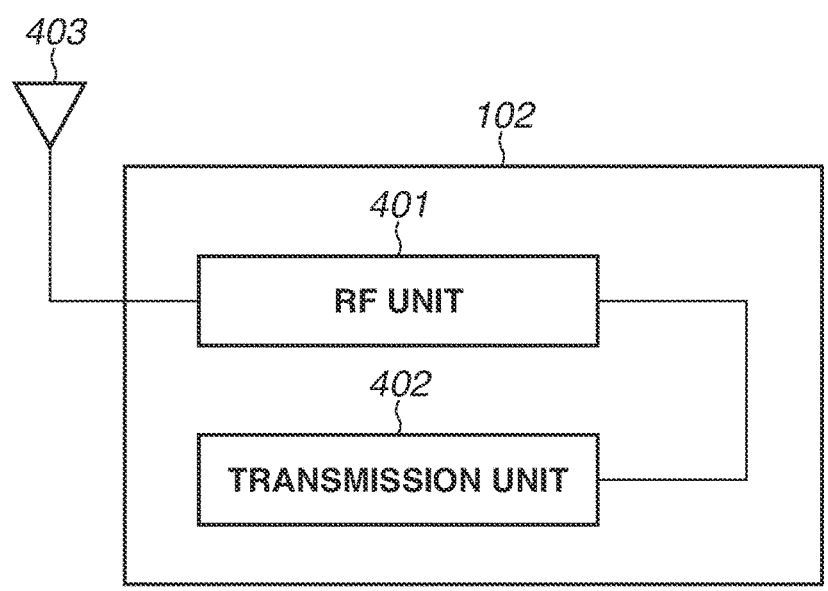
FIG. 4 is a block diagram illustrating a hardware configuration of a wireless tag.

FIG. 4 is a block diagram illustrating a hardware configuration of the wireless tag 102. A radiofrequency (RF) unit 401 executes wireless communication compliant with the IEEE 802.11 series via an antenna 403. A transmission unit 402 controls the RF unit 401 to periodically transmit the identifier information of the wireless tag 102.

Figure 5:
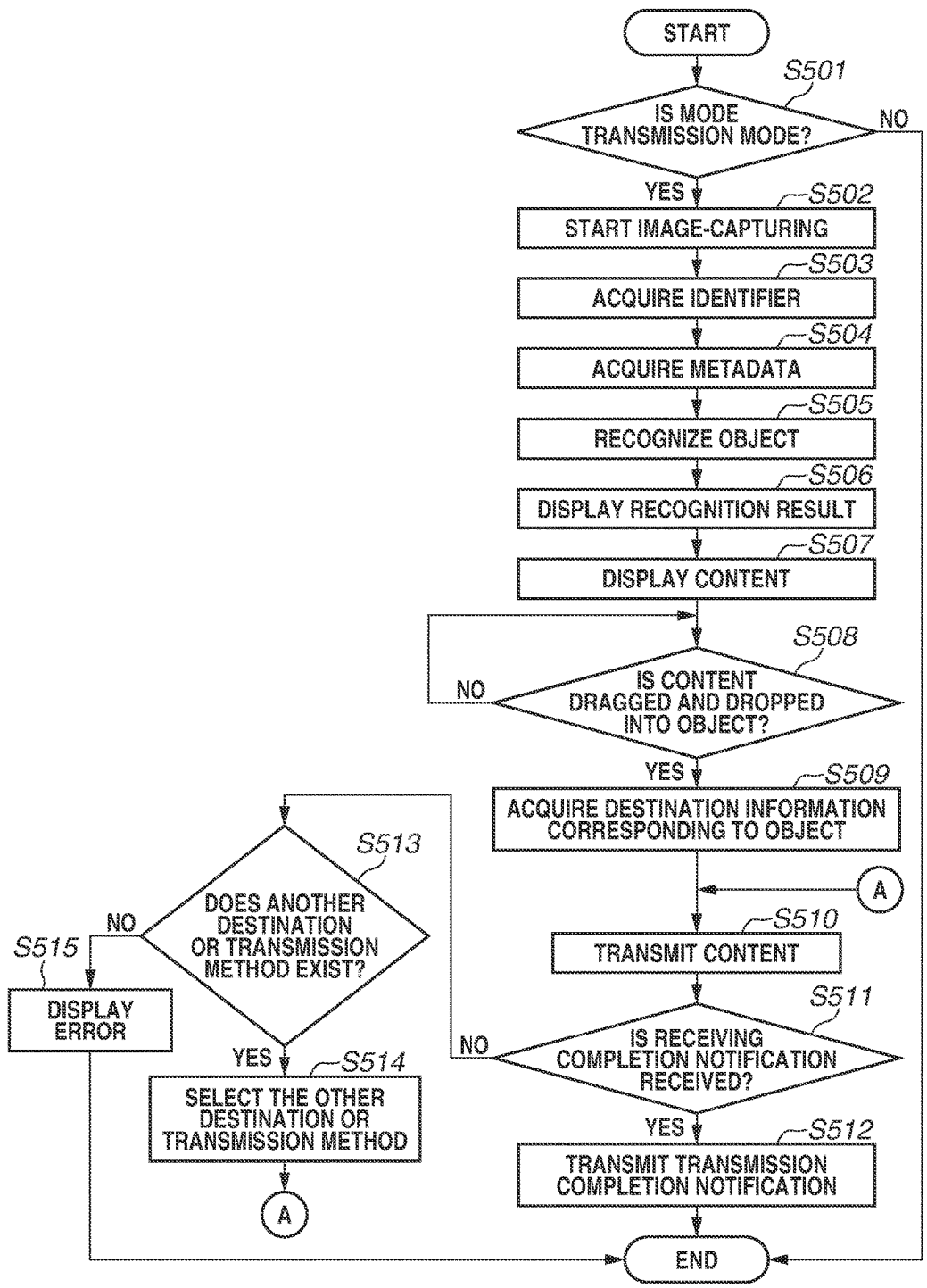
FIG. 5 is a flowchart illustrating processing realized by the information processing apparatus.

FIG. 5 is a flowchart illustrating a processing flow which the control unit 202 realizes by reading and executing the program stored in the storage unit 201 when the information processing apparatus 101 transmits the content.

Further, a sequence chart of a data transmission system is illustrated in FIG. 9. Hereinafter, the processing will be described with reference to FIGS. 5 and 9.

First, in step S501, the information processing apparatus 101 determines whether the mode is a transmission mode for transmitting the content. For example, an imaging mode for capturing an image via the image capture unit 203 and a reproducing mode for browsing the content are provided as other modes different from the transmission mode.

In the present exemplary embodiment, the user can select a mode via the input/output unit 204. However, the configuration is not limited to the above, and the information processing apparatus 101 may enter the transmission mode when the wireless tag 102 is detected in its vicinity. Further, the information processing apparatus 101 may prompt the user to set a mode to the transmission mode when the wireless tag 102 is detected in its vicinity.

As a result of determination in step S501, if the mode is a mode different from the transmission mode (NO in step S501), the information processing apparatus 101 ends the processing illustrated in FIG. 5.

On the other hand, if the mode is the transmission mode (YES in step S501), the processing proceeds to step S502. In step S502, the image capture unit 203 starts image-capturing. In concurrent with the image-capturing, in step S503, the identifier acquisition unit 301 acquires identifier information. Herein, in step M901, the identifier acquisition unit 301 acquires the identifier information of the wireless tag 102 from the wireless tag 102 via the communication unit 205. Further, in step M902, the identifier acquisition unit 301 acquires the identifier information of the printer 105 from the two-dimensional barcode attached to the printer 105 via the image capture unit 203. Alternatively, the identifier acquisition unit 301 may acquire the identification information from a wireless tag included in the printer 105.

When the identifier information is acquired, in step S504, the metadata acquisition unit 307 acquires metadata corresponding to the identification information from the management apparatus 103. Specifically, in step M903, the metadata acquisition unit 307 transmits a metadata request signal including the identifier information to the management apparatus 103. When the management apparatus 103 receives the metadata request signal, in step M904, the management apparatus 103 transmits a response signal that includes the metadata corresponding to the identifier information included in the request signal. The metadata acquisition unit 307 acquires the metadata by receiving the response signal. The metadata acquired as the above is stored in the storage unit 201.

Figure 6A:
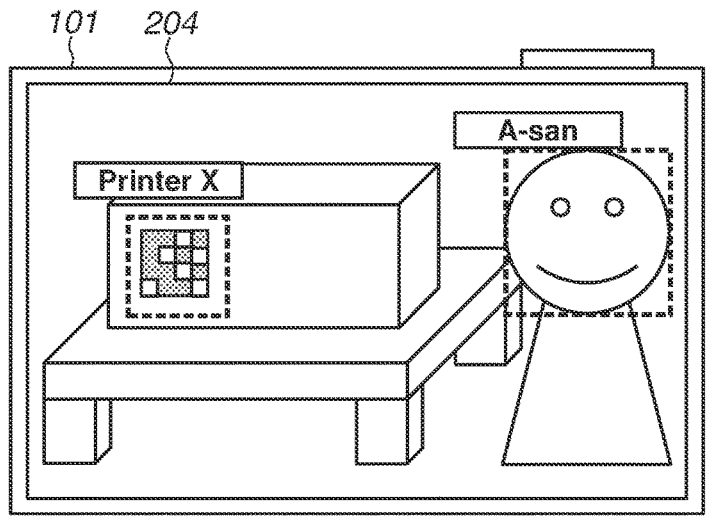
FIGS. 6A, 6B, and 6C are diagrams illustrating examples of display screens.

After the metadata is acquired, in step S505, the recognition unit 303 recognizes the object included in the image captured by the image capture unit 203 through image analysis based on the image feature information included in the metadata. When the object is recognized, in step S506, the input/output unit 204 displays a recognition result by superimposing the recognition result on the captured image. Herein, the recognition result is displayed as illustrated in FIG. 6A. In addition, the recognition result is displayed in real time in accordance with the image-capturing operation of the imaging unit 203.

Further, in FIG. 6A, a dotted frame that indicates a recognized object and a name or a nominal designation of the object are displayed as the recognition result. However, an address as a transmission destination of the content or a comment may be displayed instead of the name or the nominal designation. In this case, the name, the nominal designation, the address, or the comment is managed by the management apparatus 103 and included in the metadata.

Further, any one of the name or the nominal designation and the dotted frame that indicates the recognized object may be displayed thereon. With this configuration, the user can check the recognized object on a display screen.

Figure 6B:
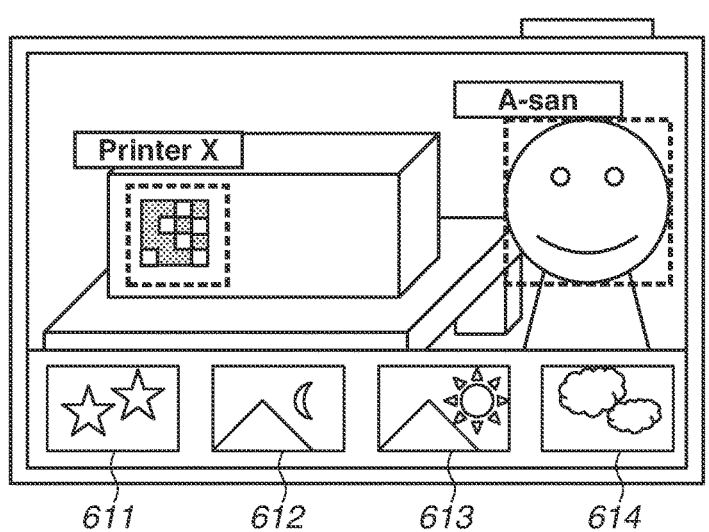
Figure 6C:
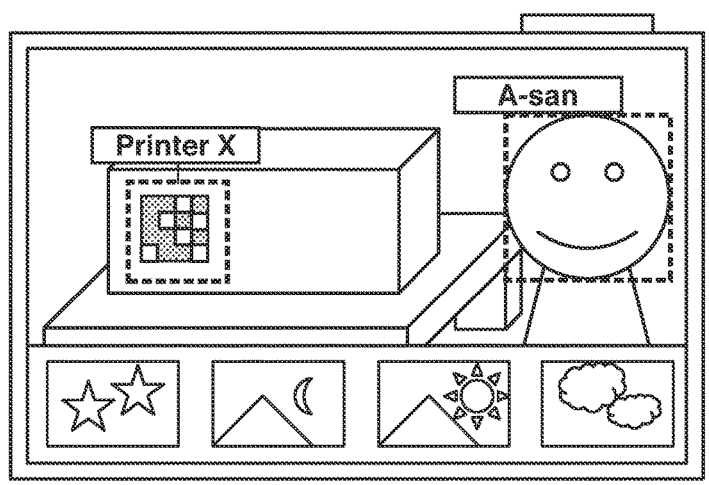

Further, in step S507, the input/output unit 204 arranges and displays contents together with the image. Herein, thumbnails of at least a part of the contents (i.e., contents 611 to 614) stored in the storage unit 201 are displayed as illustrated in FIG. 6B. Further, in addition to or in place of the contents stored in the storage unit 201, thumbnails of contents stored in the shared server 106 may be displayed.

Figure 7A:
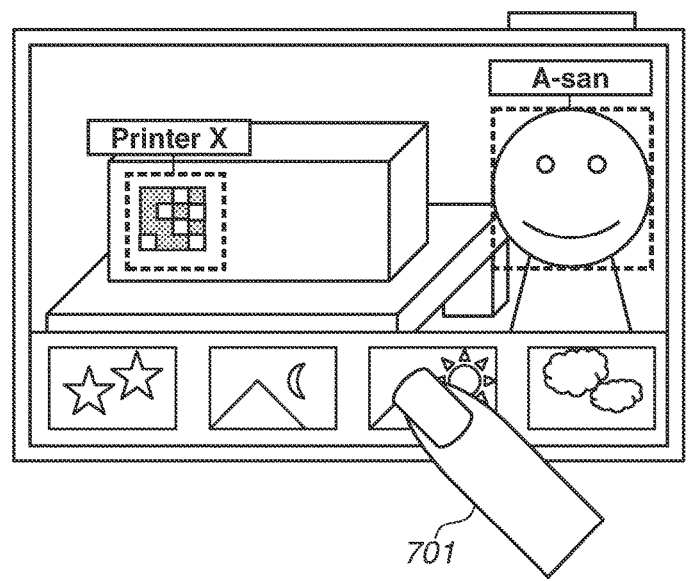
FIGS. 7A, 7B, and 7C are diagrams illustrating a drag-and-drop operation.
Figure 7B:
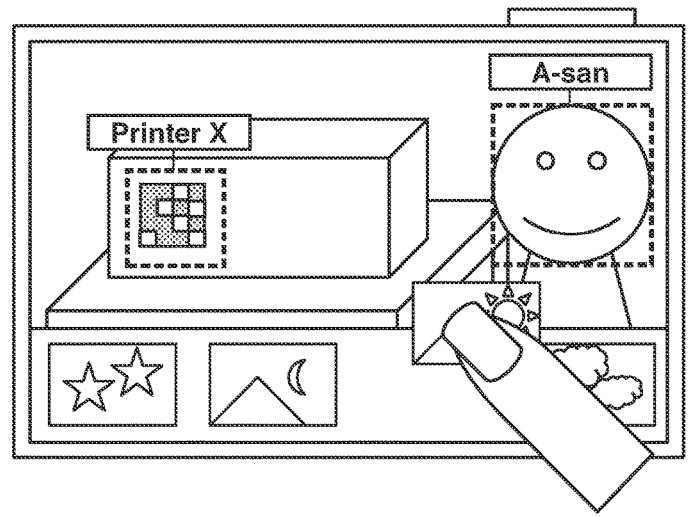
Figure 7C:
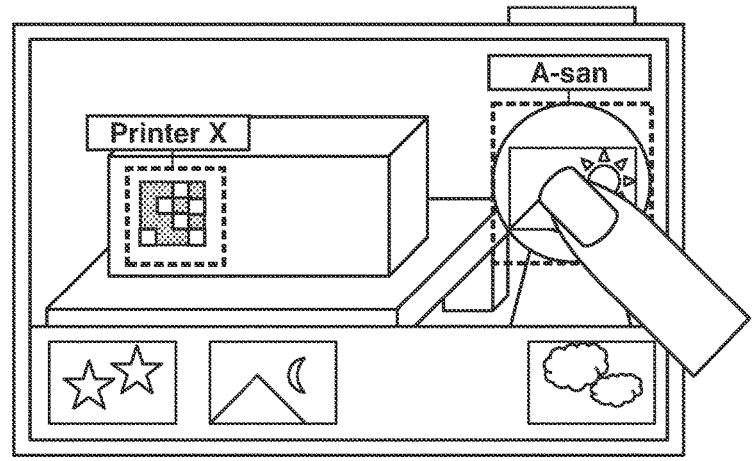

Next, in step S508, the input/output unit 204 detects a D-and-D operation executed by the user. Herein, as illustrated in FIGS. 7A to 7C, the user "D-and-D" the content 613 into an object "A-san". In addition, FIGS. 7A to 7C sequentially illustrate respective states of the D-and-D operation. Then, the input/output unit 204 detects the D-and-D operation. Through the detection, the information processing apparatus 101 determines that the user has specified the object "A-san" and the content 613.

Herein, the states illustrated in FIGS. 7A to 7C will be described in detail. In FIG. 7A, the user touches the content 613 displayed on the touch panel serving as the input/output unit 204 with a finger. In FIG. 7B, from the state illustrated in FIG. 7A, the user moves the finger in a direction of the object "A-san" without separating the finger from the touch panel ("drag"). When the user moves the finger without separating the finger from the touch panel, the content 613 displayed on the touch panel also moves along with the finger. In FIG. 7C, the user moves the finger over the object "A-san" and separates the finger from the touch panel ("drop"). When the user separates the finger from the touch panel, the touch panel acquires coordinates of the image where the user has separated the finger. Then, the information processing apparatus 101 determines whether the acquired coordinates exist within the dotted frame that indicates the recognized object. If the coordinates exist within the dotted frame that indicates the recognized object, the information processing apparatus 101 determines that the user has separated the finger at the object corresponding to the dotted frame, and determines that the content is dragged and dropped into the object (YES in step S508). As described above, the information processing apparatus 101 detects that the user "D-and-D" the content 613 into the object "A-san", and determines this detection as a user's instruction for transmitting the content 613 to the apparatus associated with the object "A-san".

Further, instead of detecting the D-and-D operation, the information processing apparatus 101 may detect a touching operation in which two places on the touch panel such as the object "A-san" as the imaging object 104 and the content 613 are touched simultaneously, so as to determine the touching operation as the user's instruction for transmitting the content 613 to the apparatus associated with the object "A-san". Furthermore, when the user executes a pinching operation by touching two places on the touch panel such as the object "A-san" as the imaging object 104 and the content 613 with fingers while moving the fingers close to each other, the information processing apparatus 101 may determine the pinching operation as the user's instruction for transmitting the content 613 to the apparatus associated with the object "A-san". In addition, the D-and-D operation using a mouse may be detected instead of the D-and-D operation using a finger.

Description will be given by returning to FIG. 5. When the D-and-D operation is detected (YES in step S508), the processing proceeds to step S509. In step S509, the metadata acquisition unit 307 acquires destination information corresponding to the object specified by the user. Specifically, in step S504, the metadata acquisition unit 307 acquires destination information included in the metadata stored in the storage unit 201. Herein, as the destination information, the metadata acquisition unit 307 acquires address information of the shared server 106 used by the smartphone 107 owned by the imaging target 104.

However, the configuration is not limited to the above, and metadata including the image feature information, which does not include the destination information, may be acquired in step S504, and metadata including the destination information may be acquired from the management apparatus 103 in step S509. With this configuration, a volume of communication with the management apparatus 103 can be reduced because only necessary information is acquired from the management apparatus 103.

Then, in step S510, the transmission unit 306 transmits the specified content to the apparatus identified by the destination information. Herein, in step M905, the transmission unit 306 transmits the content 613 to the shared server 106. Further, in step M906, the information processing apparatus 101 separately sends an e-mail or an SMS to notify the smartphone 107 of the information indicating that the content 613 has been transmitted to the shared server 106 and the information necessary for acquiring the content 613 from the shared server 106. The information necessary for acquiring the content 613 from the shared server 106 may be log-in information or authentication information. Then, the smartphone 107 acquires the content 613 from the shared server 106. Details thereof will be described below.

Further, a transmission method is not limited to the above, and if the apparatus identified by the destination information is the smartphone 107 itself, the information processing apparatus 101 may transmit the content 613 thereto by directly communicating with the smartphone 107 through wireless communication using the Wi-Fi Direct.

In addition, if the destination information is a mail address while the apparatus identified by the destination information is a mail server (not illustrated), the information processing apparatus 101 may transmit the content 613 to the mail server.

Further, if a plurality of destinations is included as the destination information, the transmission destination may be determined based on the size of the content to be transmitted. Specifically, description will be given to the case where a mail address and information about the shared server 106 are included in the metadata as the destination information. In this case, if a size of the content to be transmitted is greater than a content size attachable to a mail (e.g., 3 megabytes), the information processing apparatus 101 determines that the content is transmitted to the shared server 106, and if the content size is the attachable size, the information processing apparatus 101 determines that the content is transmitted to the mail server. As described above, the content can be transmitted to the appropriate transmission destination.

Further, mailing software for transmitting the specified content to the apparatus identified by the destination information may be activated. In this case, when the mailing software is activated, the apparatus information is set as a destination whereas the specified content is set as an attached data. With this configuration, the content can be easily transmitted via an e-mail.

Thereafter, in step S511, the transmission unit 306 waits for a receiving completion notification of the content, which is transmitted from the apparatus as a transmission destination of the content in step M909. If the receiving completion notification is received within a predetermined time (YES in step S511), the processing proceeds to step S512. In step S512, the input/output unit 204 notifies the user that transmission of the content has been completed and ends the processing illustrated in FIG. 5.

On the other hand, if the information processing apparatus 101 does not receive the receiving completion notification within a predetermined time or receives an error notification (NO in step S511), the processing proceeds to step S513. In step S513, the information processing apparatus 101 determines whether another destination information or transmission method exists.

More specifically, the information processing apparatus 101 determines that the other destination information exists in a case where the metadata includes a plurality of pieces of destination information while there is a destination to which transmission of the content has not yet been tried. Further, in addition to the method for transmitting the content to the mail server, in a case where a method for transmitting the content through direct wireless communication or a method for transmitting the content to the shared server 106 is provided as a method for transmitting the content, the information processing apparatus 101 determines that the other transmission method exists. The user can previously register the above transmission methods, or information about a plurality of transmission methods can be previously included in the metadata. Furthermore, communication compliant with different communication methods can be executed according to the transmission methods.

In a case where the other destination information or transmission method exists (YES in step S513), the processing proceeds to step S514. In step S514, the information processing apparatus 101 selects the other destination or transmission method. Then, in step S510, the content is transmitted again through the other selected destination or transmission method.

On the other hand, in a case where the other destination information or transmission method does not exist (NO in step S513), the processing proceeds to step S515. In step S515, the input/output unit 204 notifies the user of an error indicating that transmission of the content has failed. In addition, the information processing apparatus 101 also determines that the other destination information or transmission method does not exist if transmission of the content has failed even though the information processing apparatus 101 has thoroughly tried a plurality of pieces of destination information and transmission methods. Further, in addition to displaying an error on the screen, the error may be notified through a sound, blinking of a light-emitting diode (LED), or vibrations.

With reference the flowchart in FIG. 8, description will be given to the processing which a control unit realizes by reading and executing a program stored in a storage unit (not illustrated) included in the smartphone 107 when the smartphone 107 receives the content.

In step S801, the smartphone 107 receives a message relating to the content which is transmitted from the information processing apparatus 101 in step M906. For example, the message relating to the content may be a notification of mail reception, a notification of upload of the content in the shared server 106, or a message including the content itself.

After receiving the message, in step S802, the smartphone 107 determines whether the message includes the content itself. If the message includes the content itself (YES in step S802), the processing proceeds to step S805. In step S805, the smartphone 107 transmits a receiving completion notification of the content to the information processing apparatus 101 serving as a transmission source of the message. Then, in step S806, the smartphone 107 displays the content and ends the processing illustrated in FIG. 8.

On the other hand, if the message does not include the content itself (NO in step S802), the processing proceeds to step S803. In step S803, the smartphone 107 inquires of the imaging target 104 as a user whether acquisition of the content is permitted. As a result, if the user selects not to acquire the content (NO in step S803), the processing illustrated in FIG. 8 is ended.

On the other hand, if the user selects to acquire the content (YES in step S803), the processing proceeds to step S804. In step S804, the smartphone 107 executes acquisition processing of the content. Specifically, in steps M907 and M908, the smartphone 107 acquires the content by receiving an e-mail and accessing the shared server 106. In addition, the smartphone 107 may omit the inquiry in step S803 and execute acquisition processing of the content.

After acquiring the content, in steps S805 and M909, the smartphone 107 transmits the receiving completion notification of the content to the image processing apparatus 101 serving as a transmission source of the message. Then, in step S806, the smartphone 107 displays the content and ends the processing illustrated in FIG. 8.

As described above, in the present exemplary embodiment, the information processing apparatus 101 recognizes the object from the captured image in real time. Then, when the user drags and drops the data saved within the information processing apparatus 101 into the recognized object, the information processing apparatus 101 transmits the dropped data to the apparatus associated with the recognized object.

With this configuration, it is possible to transmit data to an object or a user existing in an area that can be captured by the imaging unit 203 of the information processing apparatus 101 through an intuitive operation. In other words, because the data is transmitted to the apparatus corresponding to the object recognized from the image, an addressee of the data can be selected easily, and thus the convenience of the user is improved.

In the above-described exemplary embodiment, a configuration in which the content 613 is transmitted to and displayed by the smartphone 107 has been described as an example. However, for example, if the content 613 is transmitted to the printer 105, the content 613 is printed by the printer 105.

Further, the data to be transmitted is not limited to the content, and predetermined command data may be included therein. For example, if a shutter command is treated as transmission data and dragged and dropped into the imaging target 104, an image-capturing operation may be executed by the smartphone 107 owned by the imaging target 104.

Further, for example, if an alarm-sounding command is treated as transmission data and dragged and dropped into the imaging target 104, an alarm may be activated by the smartphone 107 owned by the imaging target 104.

In the above-described exemplary embodiment, the metadata has been acquired from the management apparatus 103. However, the exemplary embodiment is not limited to the above, and the metadata may be acquired from the wireless tag 102 or the two-dimensional barcode.

In the above-described exemplary embodiment, the information processing apparatus 101 has executed object recognition based on the image feature information. However, the exemplary embodiment is not limited to the above, and the captured image data and the image feature information may be transmitted to another server on the network similar to the management apparatus 103, and the object recognition may be executed by the other server. In this case, the server that executes object recognition feeds back the information about a recognized object and a position to the information processing apparatus 101. With this configuration, even if the information processing apparatus 101 has low processing capacity, it is possible to acquire a similar effect.

In the above-described exemplary embodiment, the information processing apparatus 101 has executed object recognition based on the image feature information. However, the exemplary embodiment is not limited to the above, and recognition employing a generic object recognition method may be executed on the image. Further, in the above-described exemplary embodiment, the metadata has been acquired from the management apparatus 103. However, the exemplary embodiment is not limited to the above, and the metadata may be previously stored in the storage unit 201.

Further, in the above-described exemplary embodiment, the management apparatus 103 has transmitted the metadata. At this time, if the management apparatus 103 does not have metadata corresponding to the identifier information, the management apparatus 103 transmits an error notification. Then, when the information processing apparatus 101 receives the error notification, the information processing apparatus 101 notifies the user of the error and ends the processing illustrated in FIG. 5.

Further, when the metadata is to be acquired in step S504, the information processing apparatus 101 may transmit the identification information of the information processing apparatus 101 or user account information to the management apparatus 103 to cause the management apparatus 103 to execute the recognition. For example, based on the identification information of the information processing apparatus 101, the management apparatus 103 may execute control so as to provide only the metadata of the printer 105 without providing the metadata of the imaging target 104. With this configuration, an addressee to which the metadata is to be provided can be restricted, and thus the security thereof can be improved.

Further, the management apparatus 103 and the shared server 106 according to the above-described exemplary embodiment may be configured of a cloud system configured of a plurality of apparatuses. Further, the management apparatus 103 and the shared server 106 may be configured of a single apparatus.

In the above-described exemplary embodiment, the object included in the image captured by the information processing apparatus 101 has been recognized. Instead of the above, the information processing apparatus 101 may acquire an image captured by another imaging apparatus (not illustrated) and recognize an object included in the acquired image.

In the above-described exemplary embodiment, the user has specified the object included in the image. However, the exemplary embodiment is not limited to the above, and a user's operation for specifying the object may be omitted if only one object is recognized in the image captured by the information processing apparatus 101. With this configuration, the user can transmit the content to the object by simply capturing the object as a transmission target of the content.

Further, in a predetermined operation mode, even if a plurality of objects is recognized in the image captured by the information processing apparatus 101, the user's operation for specifying the object may be omitted while the content is transmitted to a plurality of recognized objects. Details thereof will be omitted because the configuration is similar to the above-described configuration.

The present invention can be realized through processing in which a program for realizing one or more functions according to the above-described exemplary embodiments is supplied to a system or an apparatus via a network or a storage medium, and one or more processors in the system or the apparatus reads and executes the program. Further, the present invention can be also realized by a circuit (e.g., application specific integrated circuit (ASIC)) that realizes one or more functions.

Further, the present invention includes some effects from among one or a plurality of effects described above.

According to the present invention, it is possible to easily select an addressee of data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-144407, filed Jul. 21, 2015, which is hereby incorporated by reference herein in its entirety.

What is claimed is:

1. An information processing apparatus comprising:
a first acquisition unit configured to acquire an image;
a recognition unit configured to recognize an object included in the image;
a specification unit configured to cause a user to specify data to be transmitted to the object recognized by the recognition unit; and
a transmission unit configured to transmit the specified data to an apparatus identified by destination information corresponding to the object, according to the specification by the specification unit.

2. The information processing apparatus according to claim 1,
wherein the specification unit causes a user to specify the object recognized by the recognition unit and the data to be transmitted, and
wherein the transmission unit transmits the specified data to the apparatus identified by the destination information corresponding to the object specified by the specification unit, according to the specification by the specification unit.

3. The information processing apparatus according to claim 1, wherein the specification unit causes a user to specify the object included in the image and the data to be transmitted by causing the user to drag the data to be transmitted into the object included in the image.

4. The information processing apparatus according to claim 1, wherein the specification unit causes a user to specify the object included in the image and the data to be transmitted by causing the user to specify the data to be transmitted and the object included in the image with a finger.

5. The information processing apparatus according to claim 1, further comprising a display unit configured to display a recognition result of the recognition by the recognition unit.

6. The information processing apparatus according to claim 5, wherein the display unit superimposes and displays the image and the recognition result.

7. The information processing apparatus according to claim 5, wherein the display unit arranges and displays the image and the data to be transmitted by the transmission unit.

8. The information processing apparatus according to claim 1, further comprising an image capture unit configured to execute image-capturing,
wherein the first acquisition unit acquires the image via the image-capturing executed by the image capture unit.

9. The information processing apparatus according to claim 1, further comprising a second acquisition unit configured to acquire the destination information corresponding to the specified object from another apparatus.

10. The information processing apparatus according to claim 9, further comprising a third acquisition unit configured to acquire identification information used for recognizing the object,
wherein the second acquisition unit acquires the destination information according to the identification information from the other apparatus.

11. The information processing apparatus according to claim 10, further comprising a fourth acquisition unit configured to acquire image feature information corresponding to the identification information,
  wherein the recognition unit recognizes the object based on the image feature information.

12. The information processing apparatus according to claim 1, wherein, in a case where the transmission unit fails to transmit data through a first transmission method, the transmission unit transmits the data through a second transmission method different from the first transmission method.

13. The information processing apparatus according to claim 1,
  wherein the recognition unit recognizes a plurality of objects included in the image, and
  wherein the specification unit causes a user to specify one of the plurality of recognized objects.

14. The information processing apparatus according to claim 1, wherein the data is any one of image data, command data, and document data.

15. A transmission method for an information processing apparatus, the transmission method comprising:
  acquiring an image;
  recognizing an object included in the image;
  causing a user to specify data to be transmitted to the recognized object; and
  transmitting the specified data to an apparatus identified by destination information corresponding to the object, according to the specification.

16. A non-transitory computer-readable storage medium storing a program to cause a computer to execute a transmission method for an information processing apparatus, the transmission method comprising:
  acquiring an image;
  recognizing an object included in the image;
  causing a user to specify data to be transmitted to the recognized object; and
  transmitting the specified data to an apparatus identified by destination information corresponding to the object, according to the specification.

* * * * *